United States Patent [19]

Towery

[11] Patent Number: 5,002,208
[45] Date of Patent: Mar. 26, 1991

[54] PRODUCT CONTAINER WITH BUILT-IN MEASURING DISPENSER

[76] Inventor: Alfred L. Towery, 11536 Cr 2174, Whitehouse, Tex. 75951

[21] Appl. No.: 460,742

[22] Filed: Jan. 4, 1990

[51] Int. Cl.⁵ .............................................. G01F 11/02
[52] U.S. Cl. .................................... 222/438; 222/443
[58] Field of Search ................. 222/48, 305, 306, 307, 222/437, 438, 439, 434, 435, 454, 455, 456, 457, 444, 368, 566

[56] References Cited

U.S. PATENT DOCUMENTS

| | | | |
|---|---|---|---|
| 1,411,000 | 3/1922 | Condon | 222/305 |
| 3,217,940 | 11/1965 | Fahn et al. | 222/508 |
| 3,511,416 | 5/1970 | Michie | 222/305 |
| 4,144,989 | 3/1979 | Joy | 222/438 |

Primary Examiner—Andres Kashnikow
Assistant Examiner—Philippe Derakshani
Attorney, Agent, or Firm—Harold H. Dutton, Jr.

[57] ABSTRACT

A container for dispensing a measured quantity of the contents contained therein, the container comprising a plurality of walls and a rectangular opening formed in one of the walls, a pour spout secured in the opening, the spout comprising a front wall and a pair of generally triangular side walls and a rear wall, the front and side walls being fixedly pivotally connected to the front wall along one edge so as to be movable toward and away from the front wall, and an actuator for adjusting the relative position of the front and rear walls externally of the container and thereby adjusting the volume of the spout and for opening the spout.

16 Claims, 3 Drawing Sheets

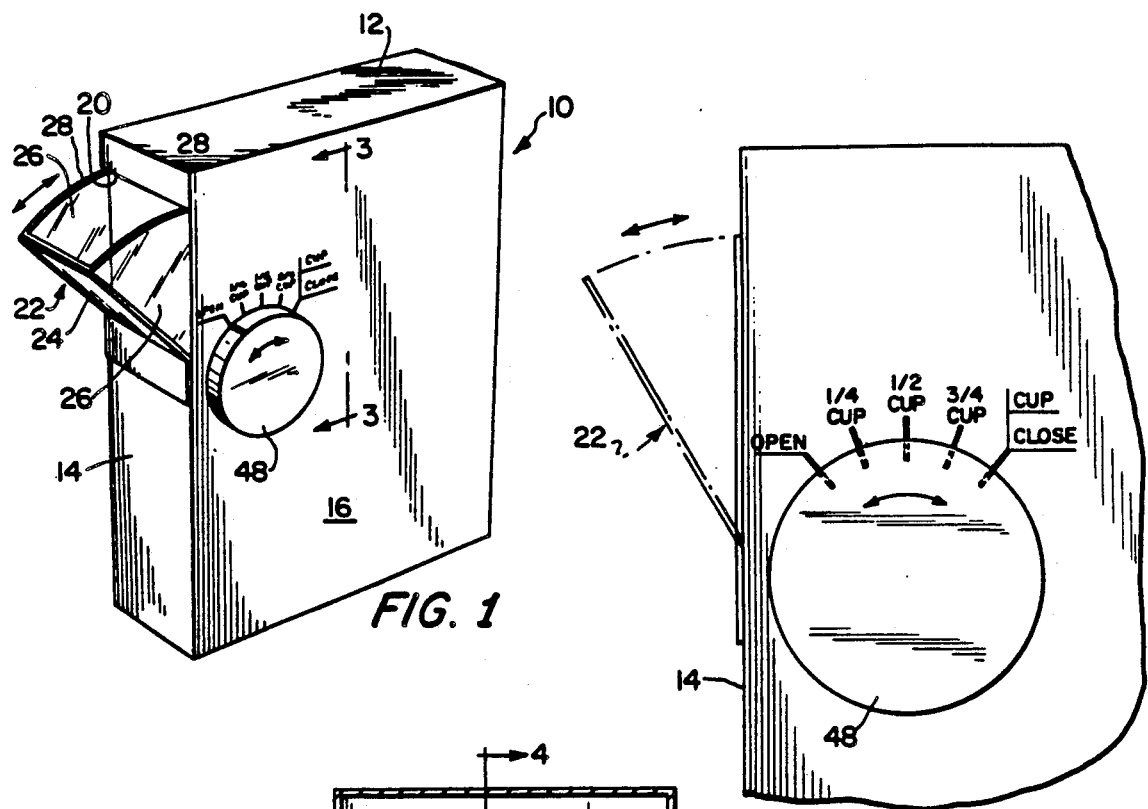
FIG. 1
FIG. 2
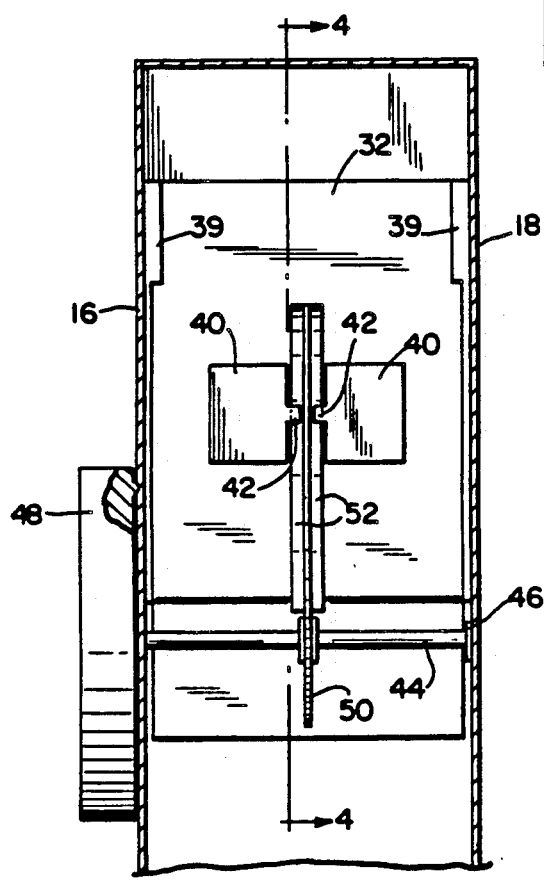
FIG. 3

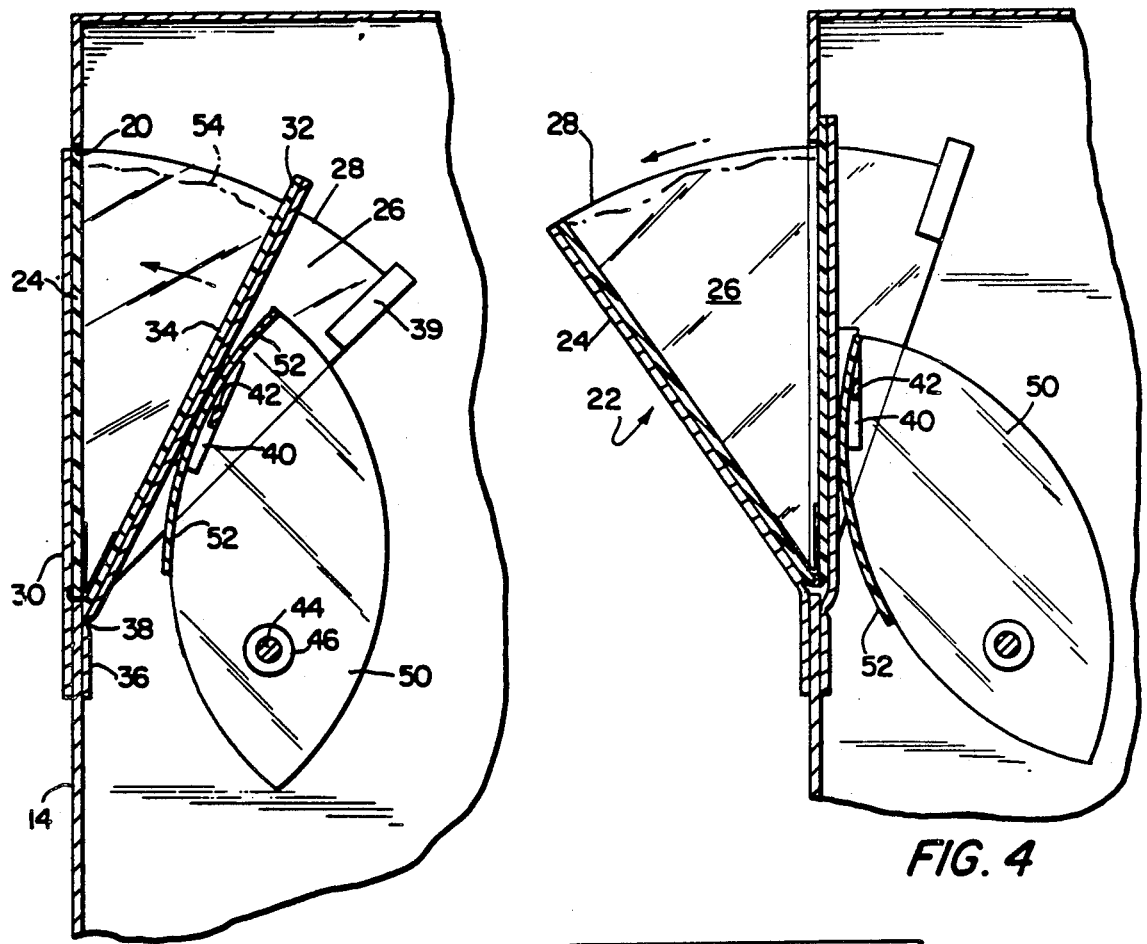
FIG. 5
FIG. 4
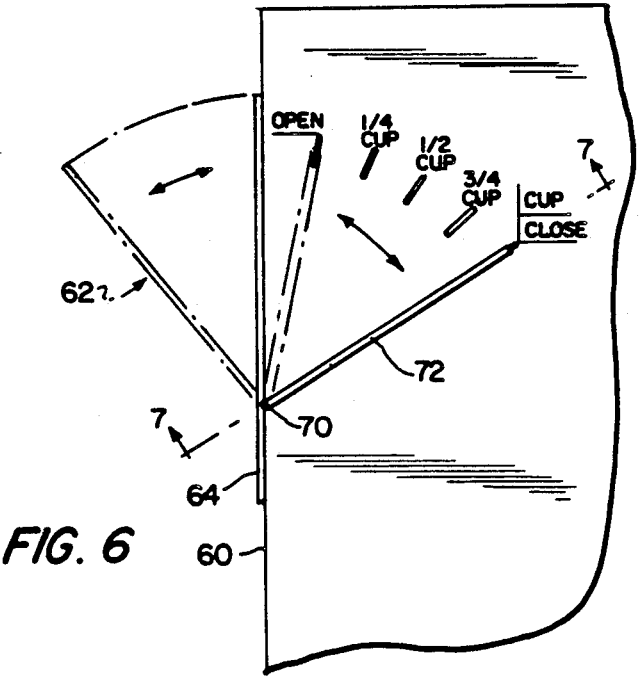
FIG. 6

PRODUCT CONTAINER WITH BUILT-IN MEASURING DISPENSER

This invention relates to a container for a free flowing product, which container is provided with a built-in measuring dispenser. More particularly, this invention relates to a container for free flowing, particulate products such as laundry detergents, bleaches, cereals and the like, from which a measured quantity of the product may be dispensed.

BACKGROUND AND OBJECTS

In the past, a number of dispensing containers have appeared in the prior art for free flowing particulate material. For example, U.S. Pat. No. 1,411,000 to Condon discloses such a device comprising a container with a spout of variable volume. U.S. Pat. No. 3,927,862 to Holmstrom discloses a different type of such a dispensing spout, but intended for the generally same purpose.

These and other prior art types of dispensing spouts have all apparently met with little success, as the dominant spout on the market contains no device by which the contents to be dispensed can be measured prior to dispensing and thus only permit a free flowing pour of the contents.

One problem with the prior art devices include both the reliability of such devices and their ease of operation. Usually, in order to meet the need for a reliable dispensing spout, a rather expensive type of measuring device would have to be designed, and this would increase the cost of such a device to the extent that it no longer is economically feasible.

In addition, some such prior art devices have been designed such that although they permit dispensing of a measured quantity of product, they do not permit a free pour or free flow of an unmeasured quantity. Thus, for a large quantity of product, it would be necessary to dispense a number of smaller, measured quantities. This is of course time consuming, and could tend to discourage purchase of the product contained in the container.

The present invention overcomes these problems associated with the prior art by providing a simple device by which a free flowing, granular or particulate product may be dispensed in a measured quantity as selected by the user.

Accordingly, a primary object of the present invention is to provide a measuring, dispensing spout for containers.

Another object of the invention is to provide a dispensing spout which may be sold with the product container at a minimal additional cost.

A further object of the invention is to provide a dispensing spout for containers which is reliable in its measured quantity.

These and other objects of this invention will become apparent from a consideration of the invention in light of the accompanying specification and claims.

DESCRIPTION OF THE INVENTION

The dispensing container according to the present invention includes a spout mounted in a wall of the container. The spout includes a front wall and two side walls which are fixed with respect to themselves and the front wall. The front and side walls form a generally triangular cavity, with the lower apex of the triangle secured to the container wall along a pivot axis. The spout is also provided with a rear wall which is pivoted along the same axis and is movable with respect to the front wall so as to enable varying the volume of the spout.

An actuator is provided on the outside of the container for selectively moving the rear wall with respect to the front wall, and the actuator is provided with appropriate indicia for indicating the volume selected according to the position of the actuator. The indicator is of course calibrated with respect to the chamber volume, for example to enable dispensing ¼ cup, ½ cup, 1 cup, etc. of product. In addition, a free pour position may be provided.

In one embodiment, the actuator includes a cam member which engages the rear wall of the spout, whereby when the actuator is operated, the cam is rotated and the rear wall is thereby positioned to adjust the spout volume to correspond with the volume indicated. Then, the container is manipulated so as to fill the spout with product, whereupon further rotation of the cam to the "open" position opens the spout so that the measured contents may be poured.

In another embodiment, the actuator includes an arm which is fixedly secured to the rear wall of the spout, and includes a further arm portion which projects out of the container, terminating in an actuating arm which is used to adjust the spout volume and to open the spout to the discharge position.

In this latter embodiment, the actuating arm also functions as the indicator, and its position is movable along graduations printed on the container.

DESCRIPTION OF THE DRAWINGS

The invention will be further described with reference to the accompanying drawings, in which:

FIG. 1 is a perspective view of one embodiment of a container according to the invention;

FIG. 2 is a side view of a corner section of the container of FIG. 1;

FIG. 3 is a fragmentary sectional view of the container of FIG. 1 along lines 3—3 and viewed in the direction of the arrows;

FIG. 4 is a sectional view along lines 4—4 of FIG. 3 and viewed in the direction of the arrows;

FIG. 5 is a sectional view similar to FIG. 4, showing the spout in the closed position;

FIG. 6 is a view similar to FIG. 2 of an alternative embodiment;

DESCRIPTION OF THE PREFERRED EMBODIMENTS

Figure 7:
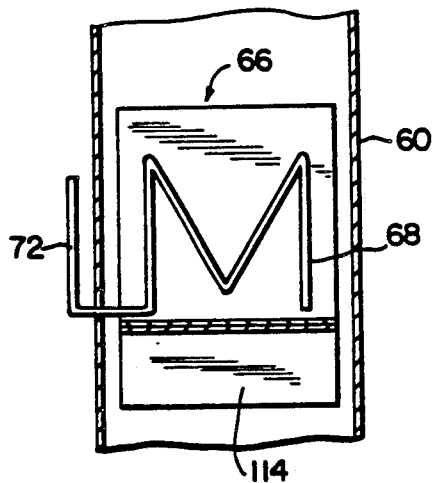
FIG. 7 is a sectional view along lines 7—7 of FIG. 6 and viewed in the direction of the arrows.

Referring now to FIGS. 1–5, the container generally designated 10 is seen to include a top wall 12 and a corresponding bottom wall (not shown), a front wall 14 and a corresponding rear wall (not shown), and side walls 16 and 18. Each of the walls of the container is rectangular so that the overall container is a parallelepiped, as shown. Of course, the walls may be other shapes, as desired, and as is known for such containers.

The container may be made of cardboard or may also be made of a suitable plastic, wood or metal material, and in the latter case, the container would be refillable and reusable, whereas in the case of a cardboard container, less expense is involved so that the container may be disposable. If the container is intended to be refillable, a removable top (not shown) may be provided.

The front wall 14 of the container 10 is provided with an opening 20 into which a spout 22 is fitted. The spout 22 includes a front wall 24 and two generally triangular side walls 26 having arcuate top edges 28.

The front wall 24 of the spout 22 is provided with a covering in the nature of a flexible sheet of material 30 adhesively bonded both to the front wall 24 and to the front wall 14 of the container. The flexible sheet of material 30 is preferably a sheet of plastic, such as polyvinyl chloride or the like, and thus serves both as decorative covering and as a hinge, due to its flexibility.

The spout 22 also includes a rear wall 32 formed of a rigid material, as is the case with the front and side walls of the spout. The rear wall 32 includes a main portion 34 of a dimension greater than the size of the opening 20 and a smaller depending portion 36 preferably connected to the main portion 34 along an integral hinge 38. Alternatively, the rear spout wall portion 34 may be attached to the inside of the front wall 14 of the container by a flexible sheet of material in a similar manner to attachment of the front wall 24 of the spout to the front wall 14 of the container as described above.

The rear wall 32 of the spout is therefore movable with respect to the front and side walls 24 and 26, and thus the position of the rear wall 32 with respect to the other walls of the spout determines the volume of the spout 22. A pair of stop members 39 are secured to each of the side walls 28 of the spout. The stop members serve to limit the rearward travel of the rear wall 32. In addition, these stops 39 cooperate with the rear wall and thereby serve to limit the opening of the spout.

Secured to the innermost surface of the rear wall 32 of the spout 22 are a pair of brackets 40. The brackets 40 each includes a projecting tang 42 which is spaced slightly from the surface of the wall 32. The tangs 42 project toward each other, as seen in FIG. 3, however a small space exists between the tangs 42.

Positioned behind the rear wall 32 of the spout is an axle shaft 44 which passes through an opening in the side wall 16 of the container. The shaft 44 is supported at one end by a bushing 46 attached to the inside surface of wall 18, and is supported as well near its other end by the opening in the wall 16, projecting slightly outside of the container 10. An actuating knob 48 is mounted on the end of the axle shaft 44 which projects from the container.

The shaft 44 carries a cam member 50 so that rotation of the knob 48 causes rotation of the shaft 44 and the cam member 50.

The cam 50 is generally planar, but is provided with a lateral projection 52 on each side along a portion of the edge of the cam 50, as seen in FIGS. 3-5. The projection along with the main section of the cam forms a "T" shape which engages the brackets 40. The cam 50 passes between the two tangs 42, while the projection 52 passes behind the tangs 42. In this manner, the cam can act to move the rear wall 32 either toward or away from the front wall 24 of the spout.

This arrangement provides for a positive movement of the rear wall 32 in both directions as the knob 48 is rotated.

The wall of the container 16 may preferably be provided with a series of graduated markings as seen in FIG. 2, indicating, for example, fractions of a cup measure. Appropriate detents may be provided between the wall 16 and the knob 48 to correspond with the graduated markings, to assist in insuring repeatable accuracy of the measure.

In operation, beginning with the spout closed and empty, as from a previous discharge, the knob 48 is rotated to the desired quantity to be dispensed. As the knob is rotated, the cam 50 rotates with the shaft 44, thereby moving the rear wall 32 of the spout to a position relative to the front wall to adjust the volume of the spout 22 so as to correspond with the selected volume to be dispensed. After the knob position has been selected, the container 10 is inverted and then returned to its upright position. This action serves to fill the spout to the volume previously selected or even to overfill the spout.

With the spout thus filled, the knob 48 may now be rotated to the "OPEN" position as indicated on the wall 16 of the container and as seen in FIG. 2. Since the spout 22 is filled with the contents, e.g. soap powder, rotation of the knob 48 after the spout has been filled does not cause relative motion of the rear wall with respect to the front wall, but instead causes a pivotal motion of the entire spout to the open position, as seen in FIG. 4. Now, inverting of the container 10 will result in pouring out the measured contents of the spout 22.

Normally, the granular, pourable nature of the contents of the container will permit over filling of the spout, however as the spout is opened, the upper edge of the opening 20 will serve to level off the contents of the spout, as the excess is scraped off and returned to the container.

After the contents of the spout have been dispensed, the knob 48 is rotated to the "CLOSE" position. Initially, as the knob is rotated, the rear wall 32 of the spout is moved rearwardly with respect to the front wall, until the rear wall contacts the stops 39. Then, continued rotation of the knob 48 will cause full closure of the spout 22, and the cycle may then be repeated.

Figure 8:
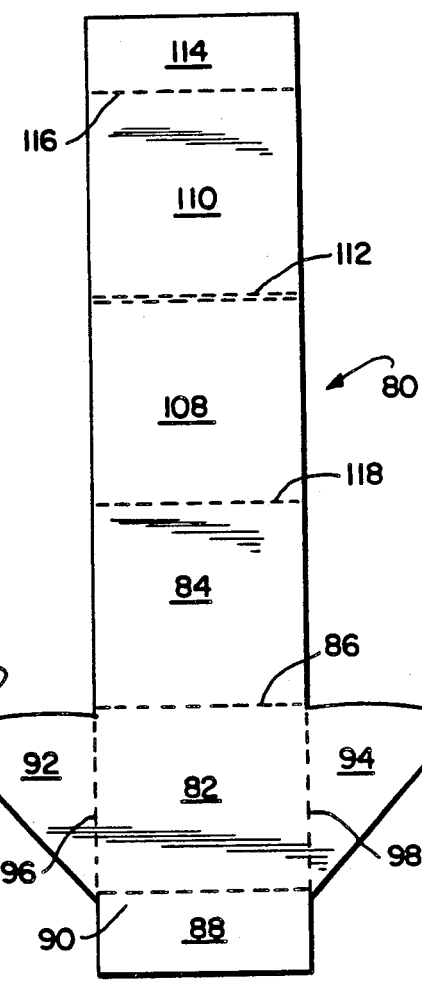
FIG. 8 is a plan view of a blank used to form the spout of the FIG. 6–7 embodiment.

Referring now to the embodiment of FIGS. 6-8, the container of this embodiment is essentially the same as that of the embodiment of FIGS. 1-5. The front wall of the container, designated 60, has an opening in which the spout 62 is mounted. The front wall of the spout 62 includes a depending glue tab 64 which may be adhesively secured to the front wall 60 of the container and a similar tab glued to the inside of the front wall. This embodiment is principally intended for use with disposable containers, and therefore in this embodiment, the spout is preferably made of a stiff cardboard material, for example the same material of which the container itself is made. Alternatively, the spout can be made of a thin metal sheet, such as is conventionally used for spouts in such containers.

The entire spout is preferably made as a single piece of material using the blank of FIG. 8. The rear wall 66 includes a wire member 68 which is attached to the rear wall, and is bent to such a shape that it reinforces and provides a structural form to a significant extent of the rear wall 66. A suitable, but non-limiting configuration is shown in FIG. 7 for this wire 68. One end of the wire extends laterally from one side of the spout at the pivot axis of the spout at 70, and then turns upwardly to form a handle section 72. A similar suitable element can be used in place of the wire, such as, for example, a molded plastic member.

FIG. 8 shows a blank which can be used to form a spout for use in this embodiment. The blank may be of cardboard, metal, or other fairly rigid material capable of being bent.

The blank generally designated 80 includes two panels 82 and 84 joined by a fold line 86, the panels forming the front wall of the spout. A glue tab 88 is joined to the panel 82 along a fold line 90, and a pair of sidewall panels 92 and 94 are joined to the panel 82 along fold lines 96 and 98 respectively. A pair of tabs 100 and 102 are attached to the panels 92 and 94, respectively, and include shoulders 104 and 106. When assembled, the tabs 100 and 102 are secured together and form a backstop for the movable wall, while the shoulders form a stop to limit the opening of the spout.

When the panels 82 and 84 are folded along the fold line 86, they are bonded together to form the front wall. The panels 108 and 110 are joined along a heavy fold line which is of a thickness sufficient to permit insertion of the wire 68 therebetween. Then, the panels 108 and 110 are bonded together.

Finally, a glue tab 114 is attached to the panel 110 along a score line 116.

When assembled, the rear spout wall is formed by the panels 108 and 110, with the wire therebetween, and the front spout wall is formed by the panels 82 and 84, and the front and rear spout walls are pivotally connected together along score line 118. The spout is secured within the container by means of the glue tabs 88 and 114 which are glued to the outside and inside, respectively, of the front wall of the container. The actuating arm then projects toward the side of the container, where it also serves as an indicator of the volume selected according to the graduations marked on the side of the container.

While this invention has been described as having certain preferred forms and embodiments, it will be understood that it is capable of still further modification, and this application is intended to cover all variations and adaptations which fall within the spirit of the invention and the scope of the appended claims.

What I claim is:

1. A container for dispensing a measured quantity of the contents contained therein and comprising a plurality of walls and a rectangular opening formed in one of said walls,
   a pour spout secured in said opening,
   said pour spout comprising a front wall and a pair of generally triangular side walls and a rear wall, said front and side walls being fixedly positioned with respect to each other, said front, side and rear walls forming a chamber therebetween for receiving contents from said container,
   said rear wall being pivotally connected to said front wall along one edge of each of said front and rear walls so as to be movable toward and away from said front wall, and
   actuator means comprising a rotational cam member acting on said rear wall for adjusting the relative position of said front and rear walls from externally of said container and thereby adjusting the volume of said spout and for opening said spout.

2. A dispensing container as in claim 1 and including indicator means for providing an indication of the selected volume of said spout.

3. A dispensing container as in claim 2 and wherein said indicator means includes an indicia on said container.

4. A dispensing container as in claim 1 and wherein said actuator means includes an operator member mounted externally of said container on a common axis with said cam member.

5. A dispensing container as in claim 4 and wherein said rear wall includes bracket means thereon for engaging said cam member.

6. A dispensing container as in claim 5 and wherein said bracket means comprises a pair of spaced bracket members each having a tang projecting therefrom and spaced from each other and from said rear wall,
   said cam member having a lateral projection on each side thereof so that said cam has a T-shape, and said lateral projections being positioned between said tangs and said rear wall.

7. A dispensing container as in claim 6 and wherein said side walls of said spout include stop means for limiting rearward travel of said rear wall with respect to said front wall.

8. A dispensing container as in claim 7 and wherein said rear wall is of a greater dimension than said opening.

9. A dispensing container as in claim 1 and wherein each of the walls of said spout is integrally connected with the other of said walls.

10. A dispensing container as in claim 9 and wherein each of the walls of said spout is formed from a single blank.

11. A dispensing container as in claim 10 and wherein said actuator means comprises a wire member secured to said rear wall and projecting from said container.

12. A dispensing container as in claim 11 and wherein said rear wall comprises two layers and said wire member is positioned between said layers.

13. A dispensing container as in claim 10 and wherein said blank comprises two panels forming said front wall, two panels forming said rear wall, one panel forming one of said side walls and another panel forming the other of said side walls.

14. A dispensing container as in claim 13 and wherein said blank includes stop tabs connected to each of said side wall panels, a glue tab connected to one of said front wall panels and a glue tab connected to one of said rear wall panels.

15. A container for dispensing a measured quantity of the contents contained therein, said container comprising a plurality of walls and a rectangular opening formed in one of said walls,
    a pour spout comprising a front wall, a pair of generally triangular side walls and a rear wall pivotally connected to said front wall so as to be pivotable toward and away from said front wall,
    actuator means for pivotally moving said rear wall toward or away from said front wall, said actuator means comprising a cam member mounted on an axle and acting an said rear wall, said axle being journalled in said container walls, and
    operator means associated with said actuator means for causing rotation of said axle and said cam member to adjust the relative position of the rear wall relative to said front and side walls and for opening said pour spout.

16. A container for dispensing a measured quantity of the contents contained therein, said container comprising a plurality of walls and a rectangular opening formed in one of said walls,
    a pour spout comprising a front wall, a pair of generally triangular side walls and a rear wall pivotally connected to said front wall so as to be pivotable toward and away from said front wall,
    actuator means for pivotally moving said rear wall toward or away from said front wall, said actuator means comprising a wire member secured to said rear wall and having an end projecting from said container, said end forming an operator for said actuator means and forming an indicator of the selected position of said rear wall.

* * * * *